(12) United States Patent
Gong et al.

(10) Patent No.: US 11,422,735 B2
(45) Date of Patent: Aug. 23, 2022

(54) ARTIFICIAL INTELLIGENCE-BASED STORAGE MONITORING

(71) Applicant: EMC IP Holding Company LLC, Hopkinton, MA (US)

(72) Inventors: Min Gong, Shanghai (CN); Michael Marrotte, Windermere, FL (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 232 days.

(21) Appl. No.: 16/864,808

(22) Filed: May 1, 2020

(65) Prior Publication Data
US 2021/0342088 A1 Nov. 4, 2021

(51) Int. Cl.
*G06F 3/06* (2006.01)
*G06K 9/62* (2022.01)

(52) U.S. Cl.
CPC .......... *G06F 3/0653* (2013.01); *G06F 3/0611* (2013.01); *G06F 3/0613* (2013.01); *G06F 3/0659* (2013.01); *G06F 3/0673* (2013.01); *G06K 9/6256* (2013.01); *G06K 9/6267* (2013.01)

(58) Field of Classification Search
None
See application file for complete search history.

(56) References Cited

PUBLICATIONS

Wikipedia, "Bag-of-words model," https://en.wikipedia.org/w/index.php?title=Bag-of-words_model&oldid=956130772, Retrieved from the Internet: Jun. 12, 2020, 5 pages.
Wikipedia, "Statistical classification," https://en.wikipedia.org/wlindex.php title=Statistical_classification&oldid=951278383, Retrieved from the Internet: Jun. 12, 2020, 6 pages.
Wikipedia, "Supervised learning," https://en.wikipedia.org/w/index.php?title=Supervised_learning&oldid=956197838, Retrieved from the Internet: Jun. 12, 2020, 9 pages.
Wikipedia, "Word embedding," https://en.wikipedia.org/w/index.php?title=Word_embedding&oldid=951683288, Retrieved from the Internet: Jun. 12, 2020, 5 pages.

*Primary Examiner* — Ernest Unelus
*Assistant Examiner* — Dayton Lewis-Taylor
(74) *Attorney, Agent, or Firm* — Amin, Turocy & Watson, LLP

(57) ABSTRACT

Techniques are provided for artificial intelligence-based storage monitoring. In an example, a system determines structured and unstructured attributes of a folder in a file system and provides them to an trained artificial intelligence model that outputs whether the folder is interesting or not. The folders labelled interesting by the trained artificial intelligence model can be further refined to a subset of folders that are placed in a watch list, and monitored for changes.

20 Claims, 15 Drawing Sheets

400

| | |
|---|---|
| 402 → 1.a | 3 |
| 404 → 1.b | 5 |
| 406 → 1.c | 3 |
| 408 → 1.d | 4 |
| 410 → 1.e | 2 |
| 412 → 1.f | 2 |

FIG. 4

| | | |
|---|---|---|
| 502 → | 2.a | "Project A" |
| 504 → | 2.b | "Projects" |
| 506 → | 2.c | {"Project B", "Project C"} |
| 508 → | 2.d | {"Pre process", "Core", "Post process"} |

| Attribute | project | A | projects | B | C | pre | process | core | post |
|---|---|---|---|---|---|---|---|---|---|
| 2.a | 1 | 1 | | | | | | | |
| 2.b | | | | 1 | | | | | |
| 2.c | 1 | | | | 1 | | | | |
|  | 1 | | | | | 1 | | | |
| 2.d | | | | | | 1 | 1 | | |
|  | | | | | | | | 1 | |
|  | | | | | | | 1 | | 1 |

604a 602b  606b

| Attribute | project | A | projects | B | C | pre | process | core | post |
|---|---|---|---|---|---|---|---|---|---|
| 2.a | 1 | 1 | | | | | | | |
| 2.b | | | | 1 | | | | | |
| 2.c | 2 | | | | 1 | 1 | | | |
| 2.d | | | | | | 1 | 2 | 1 | 1 |

| | | ITERATION K-1 910 | | | | ITERATION K 912 | | |
|---|---|---|---|---|---|---|---|---|
| | | IMPORTANCE SCORE 914 | IMPORTANCE THRESHOLD 916 | IN WATCH LIST 918 | ABNORMAL 920 | IMPORTANCE SCORE 922 | IMPORTANCE THRESHOLD 924 | IN WATCH LIST 926 |
| | PROJECT_001/ 902a | 0.51 | 0.5 | Y | Y | 0.51 | 0.4 | Y |
| | A/ 902b | 0.42 | 0.5 | N | (N/A) | 0.42 | 0.4 | Y |
| | B/ 902c | 0.43 | 0.5 | N | (N/A) | 0.43 | 0.4 | Y |
| | PROJECT_002/ 902d | 0.91 | 0.5 | Y | N | 0.81 | 0.5 | Y |
| | PROJECT_003/ 902e | 0.51 | 0.5 | Y | N | 0.49 | 0.5 | N |

FIG. 9

ARTIFICIAL INTELLIGENCE-BASED STORAGE MONITORING

TECHNICAL FIELD

The present application relates generally to monitoring usage of a file system in a computer storage system.

BACKGROUND

Computer storage systems can implement monitoring on one or more folders or directories of a storage file system. Such a folder or directory can be referred to as a directory of interest, and monitoring such a folder or directory can be referred to as directory-level infra monitoring.

BRIEF DESCRIPTION OF THE DRAWINGS

Numerous aspects, embodiments, objects, and advantages of the various embodiments will be apparent upon consideration of the following detailed description, taken in conjunction with the accompanying drawings, in which like reference characters refer to like parts throughout, and in which:

FIG. 4 illustrates an example vector of structured attributes of a folder, that can facilitate artificial intelligence-based storage monitoring, in accordance with certain embodiments of this disclosure;

FIG. 5 illustrates an example vector of unstructured attributes of a folder, that can facilitate artificial intelligence-based storage monitoring, in accordance with certain embodiments of this disclosure;

FIG. 6 illustrates example vectors of unstructured attributes of a folder that are converted to numerical values, that can facilitate artificial intelligence-based storage monitoring, in accordance with certain embodiments of this disclosure;

FIG. 9 illustrates an example of selecting folders for a watch list, that can facilitate artificial intelligence-based storage monitoring, in accordance with certain embodiments of this disclosure;

DETAILED DESCRIPTION

Overview

Figure 1:
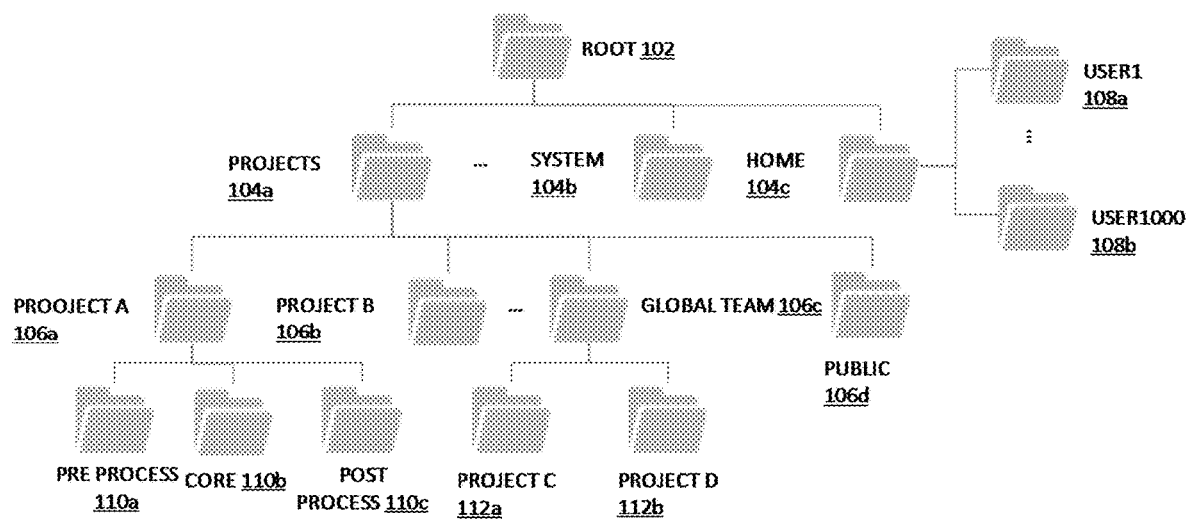
FIG. 1 illustrates an example file system hierarchy that can facilitate artificial intelligence-based storage monitoring, in accordance with certain embodiments of this disclosure.

An example of monitoring can be to monitor whether a file has been added to a particular folder. Where a file system comprises many folders, it can be infeasible to monitor all folders. In some examples, instead of watching all folders, a customer can specify a "watch list" that identifies a subset of folders that are to be watched. There can be problems with a customer-identified watch list, due to manually setting rules for what folders are watched, including a difficulty with exhausting all possibilities of folders to watch, and overlapping rules where multiple rules apply to one folder.

Large-scale storage systems can implement storage monitoring. In some storage systems, including unstructured storage systems, customers can utilize different folders to represent different business workflows. Among customers, a popular feature can be to monitor a system from a directory perspective. For example, the system can be monitored for which folders consume the most storage space, which folders are growing the fastest, which folders are being accessed the most often, or which folders involve the largest throughput. This information on folders can be utilized by customers to manage their storage.

Where customers have a huge number of folders, the customers might not care about all of them—perhaps just a small fraction of them. Additionally, sometimes drilling down in the file system of folders may be involved to produce more valuable information. For example, a root folder of a file system will be the largest folder, but this may not be useful information to a customer. So, folders deeper into the file system than root can be observed. Or, a roll up can be appropriate. For example, a customer may care about a folder like "/ifs/projects/project_abc/", but not care about all its sub folders separately (e.g. "/ifs/projects/project_abc/aaa", "/ifs/projects/project_abc/bbb", . . . ).

An approach to these problems relating to monitoring folders is to maintain a folder watch list. When a customer queries for a largest or hottest folder, the customer may actually be asking for a largest or hottest folder among folders of a watch list. A watch list can put interesting folders into a spotlight for monitoring. This approach can make it easy for customers to monitor the things they really want to monitor, and also reduce a computer workload for a monitoring system and storage system that implement monitoring on the storage system.

There can be an approach that generates the folder watch list by determining customers' requirements and uncovering which folders (or workflows) they really care about. Customers' requirements can be referred to as "patterns." An example of a pattern can be "all the project folders under '/ifs/projects' but with depth <5," or "the public folder of the team, named like 'public', 'utir', 'share', . . . ."

These patterns can be similar to rules set by humans, so a possible approach could be to establish a rule-based system to maintain the rules. However, it can be a challenge for humans to handle rules. On reason can be that an increasing number of rules can make it difficult to exhaust all possibilities. Another reason can be that patterns can overlap with each other, so it can be difficult to choose proper rules to cover all desired folders to watch.

Another approach can utilize an AI-driven methodology to detect and update an "interesting" folder watch list. By learning from a historical watch list that is defined by specific customers, or a group of similar customers, an AI-driven methodology can learn the patterns of "interesting" folders, and then detect whether a folder is interesting when given a new folder path. A watch list determined according to an approach like this can be updated iteratively, according to dynamic activities of the file system.

A solution to address these problems with watch folders can involve applying artificial intelligence/machine learning (AI/ML) techniques to detect and refine a watch list of "interesting" folders that can be monitored. An interesting folder, as used herein, can be a folder that a customer would most likely be interested in monitoring for behaviors such as consumption and usage. In some examples, these AI/ML techniques can generally be divided into two stages—a detection stage and a refinement stage.

In a detection stage, an AI/ML importance classifier can consider structured and unstructured attributes of folders and a folder hierarchy, and from those attributes, learn patterns of "interesting" folders from watch lists that have previously been used. An example of a structured attribute can be a statistic of activity for a folder. An example of an unstructured attribute can be a name of a folder. Then, the AI/ML model can recognize whether a folder is interesting or not when given a new folder path.

In a refinement stage, the candidate folders to be watched (as determined in a detection stage) are reduced or refined. A watch list can be refined by giving "abnormal" folders and their sub-folders larger weights. A pruning approach can be utilized to avoid excessive overlap of folders' paths. A lagging approach can be utilized to smooth results updated in different time steps so as to avoid the watch list from changing too much.

Empirically, customers can usually choose to manage their business workflow by file system hierarchy. This can be explored based on "unlimited" quota settings in isi gathers.
Example Architectures FIG. 1 illustrates an example file system hierarchy 100 that can facilitate artificial intelligence-based storage monitoring, in accordance with certain embodiments of this disclosure. In some examples, file system hierarchy 100 can be used to generate folder list 204 of FIG. 2, vector 400 of FIG. 4 for structured attributes, vector 500 of FIG. 5 for unstructured attributes, and example 900

As depicted a root of file system hierarchy is root folder 102. Root folder 102 has child folders comprising projects folder 104a, system folder 104b, and home folder 104c. Projects folder 104a has child folders comprising project A folder 106a, project B folder 106b, global team folder 106c, and public folder 106d. Home folder 104c has child folders comprising user1 folder 108a, and user1000 folder 108b. Project A folder 106a has child folders comprising pre process folder 110a, core folder 110b, and post process folder 110c. Global team folder 106c has child folders comprising project C folder 112a, and project D folder 112b.

In some examples, the folders under root can be categorized into three types. One type of folders can comprise system related folders, such as "var/", "etc/", "sys/", "dev/", "lib/", etc. Those folders can be generated and used by the storage system itself. Examples of these folders can be system folder 104b and home folder 104c. Another type of folders can comprise individual user folders, i.e., the folders like "/ifs/home/user_xxx". Examples of these folders can be user1 folder 108a and user1000 folder 108b. Another type of folders can comprise business related folders, i.e. the folders like "/ifs/projects/xxx". An example of these folders can be project A folder 106a, project B folder 106b, and global team folder 106c.

In some examples, customers might not be interested in system-related folders (e.g., system folder 104b) because those folders do not consume much capacity. Then, for individual user folders (e.g., user1 folder 108a) that consume a small portion of a total capacity, users can desire to set quotas on them, without being interested in the folders' usage. Business related folders (e.g., project A folder 106a) can have the most interest to customers, because those folders can be critical folders in business workflow, and consume most of the capacity and traffic (e.g., input/output operations per second (IOPS), or throughput).

An attempt to merely put all business-related folders into an "interesting" folder watch list can carry with it problems. One problem can be that a definition of "business related folders" is unclear. A customer can write multiple scripts to describe the patterns, e.g., put all the subfolders under a "projects" folder (e.g., Projects folder 104a) into the watch list. But the customer might not be able to image all of the possibilities for business related folders.

Furthermore, the terms in the folder paths themselves might not be easy to understand. A customer might use an industry-specific term in folder names instead of "projects." For example, an electronic design automation company might use a process name in semiconductor manufacturing, e.g., "fabXYZ_25" where "fabXYZ" is the name of a fabrication vender or a process generation and "25" is a pitch size (25 nm) in the fabrication. A customer might use a "fabXYZ_25" folder to include all the folders of 25 nm projects manufactured by fabXYZ fab. However, it can be hard to define a complete list of patterns to recognize business related folders.

Another problem with merely put all business-related folders into an "interesting" folder watch list can involve a hierarchical arrangement of folders within a file system. Sometimes, an interesting folder should be summarized with a roll-up folder that captures information in its subfolders. In other times, a folder should be separated into a more-detailed level. For example, project A folder 106a can belong to a big project, and a customer may care more about the next level subfolders than project A folder 106a itself, i.e. pre process folder 110a, core folder 110b, and post process folder 110c. Similarly, global team folder 106c can be named according to the name of project owner instead of project itself. In this case, it can be determined that its subfolders, project C folder 112a, and project D folder 112b, should be monitored separately. It can be difficult to decide the proper folder depth.

More generally, these problems can be of a type of classification that is easily recognized by humans, but that is difficult to be defined as rules for a computer. In some examples, this type of classification can be well-suited for an AI/ML data-driven approach.

Figure 2:
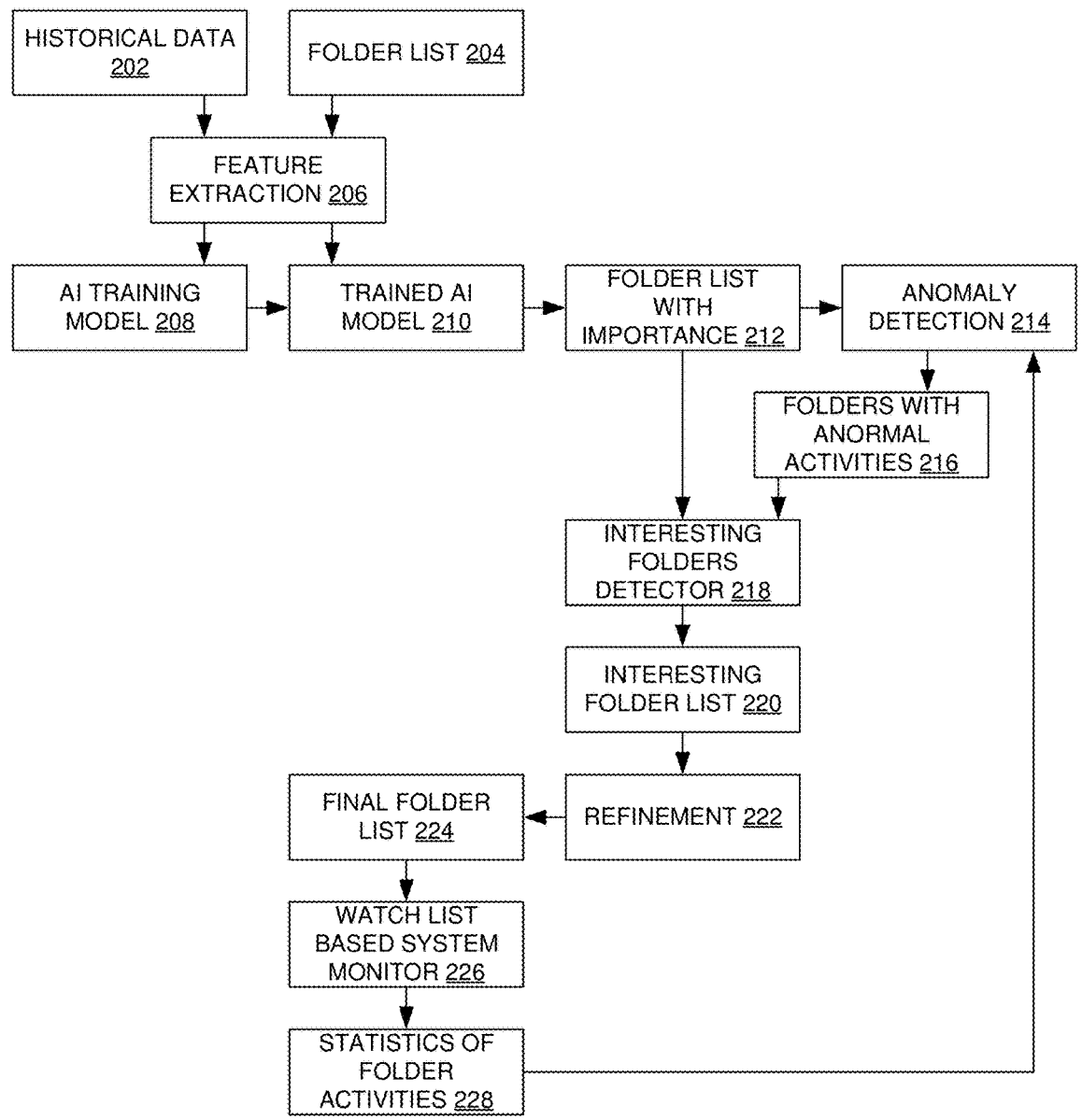
FIG. 2 illustrates an example system architecture that can facilitate artificial intelligence-based storage monitoring, in accordance with certain embodiments of this disclosure.

FIG. 2 illustrates an example system architecture 200 that can facilitate artificial intelligence-based storage monitoring, in accordance with certain embodiments of this disclosure. For example, example system architecture 200 can be used to determine a watch list of folders (such as from folder system hierarchy 100 of FIG. 1) using artificial intelligence.

To address challenges relating to classification that is easily recognized by humans, but that is difficult to be defined as rules for a computer, an AI/ML approach can be utilized to determine which are the interesting folders. This approach can be generally divided into stages. One stage can be a detection stage. As depicted in example system architecture 200, a detection stage can comprise historical data 202, folder list 204, feature extraction 206, AI model training 208, and trained AI model 210.

In a detection stage, folder importance can be determined according to structured and unstructured attributes that can be extracted from folder paths. An AI model trainer of AI model training 208 can run a classification model based on historical data of which folders are watched (e.g., historical data 202). Both structured and unstructured attributes can be characterized as a vector of numbers (e.g., in feature extraction 206). Then, folders that are contained in the historical watch list can be labeled as important, and other folders can be labeled as unimportant (e.g., by trained AI model 210 to output folder list with folder importance 212).

A supervised classification learner (e.g., AI model training 208) can be utilized to establish an AI model from input vectors of numbers to output labels. When a new folder path is input to a trained AI model (e.g., trained AI model 210), the model can output whether or not the folders are important or unimportant (e.g., folder list with folder importance 212).

Another stage of an AI/ML approach that can be utilized to determine interesting folders can combine the results of folder importance from the previous stage and folder activity statistics on a watch list in a previous iteration of applying the model. This stage can comprise folder list with folder importance 212, anomaly detection 214, folders with abnormal activities 216, and interesting folders detector 218.

This stage can consider both the static and the dynamic attributes of the folders. The folders with abnormal activities (as identified in anomaly detection 214) and their subfolders can be considered to be more likely to be interesting folders. What constitutes being anomalous can be defined by a customer, and can include things like folders with the largest throughput, IOPS, or latency. A list of interesting folders (e.g., interesting folder list 220) can be output at this stage, and used as input to a subsequent stage where refinement of the folders can occur (e.g., in refinement 222). Refinement can comprise a pruning approach and/or a lagging approach. A pruning approach can be implemented to avoid excessive overlap of folders' paths. A lagging approach can be implemented to smooth the results updated in different time steps, to avoid the watched folder list changing too much.

This refinement stage can be utilized to polish results of folders to watch. Specifically, a pruning method can be used to avoid excessive overlap of the folders' paths. A lagging approach can be used to smooth the results updated in different time steps (i.e., avoid a folder list changing too much).

Once refined, a final folder list can be output (e.g., final folder list 224). This final folder list can be used as a watch list of folders to monitor by watch list based system monitor 226. As watch list based system monitor 226 watches the folders of final folder list 224, watch list based system monitor 226 can generate statistics of folder activities 228 that can be utilized by anomaly detection 214 to identify anomalous behavior regarding the folders.

This AI/ML approach can have advantages. An AI classifier can recognize folders with high importance, by learning from the historical folder watch list. The model can consider both structured and unstructured attributes of folders, and can be more flexible than a rule-based approach. Additionally, dynamic statistics of folders can be considered to adjust results. This approach can utilize an interface to support statistics, which can make it possible to update a watch list iteratively. Furthermore, this approach can be utilized to refine the watch list to avoid issues such as too many path overlaps, and too much change in the watch list.

Structured attributes of a folder as described herein can include folder depth—a number of intermediate folders between a folder and a root directory; folder width—a number of direct files or folders under a folder; count of files—a number of files under a folder (both direct and indirect); count of folders—a number of folders under a folder (both direct and indirect); count of neighbor files (files sharing the same father folder)—a number of direct files under a father of a folder; and count of neighbor folders (folders sharing the same father folder)—a number of direct folders under a father of a folder.

Unstructured attributes of a folder as described herein can include a folder's name; a name of a father folder of a folder; one or more names of neighbor folders that share a same father folder as a folder; and one or more names of direct subfolders of a folder.

Figure 3:
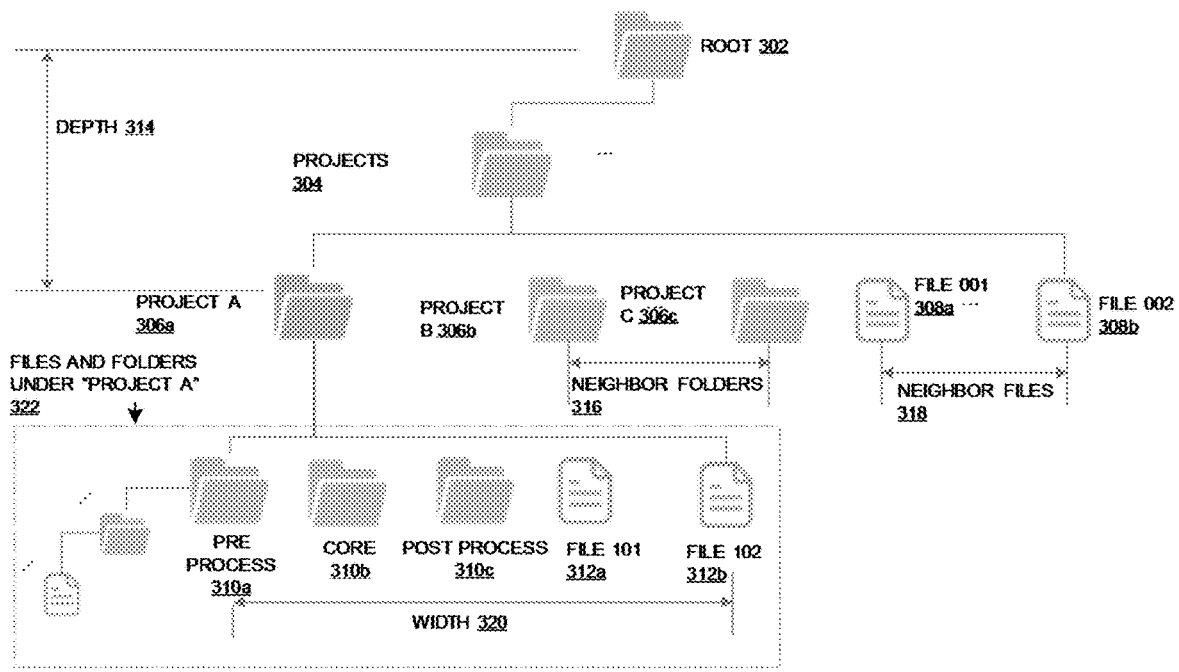
FIG. 3 illustrates an example file system hierarchy with example structured attributes and structured attributes of a folder, that can facilitate artificial intelligence-based storage monitoring, in accordance with certain embodiments of this disclosure.

FIG. 3 illustrates an example file system hierarchy 300 with structured attributes and structured attributes of a folder, that can facilitate artificial intelligence-based storage monitoring, in accordance with certain embodiments of this disclosure. In some examples, these structured attributes illustrated in example file system hierarchy can be used to generate vector 400 of FIG. 4, which captures unstructured attributes.

As depicted, file system hierarchy comprises root folder 302. Root folder 302 has child folders comprising Projects folder 304. Projects folder 304 has child folders and files comprising Project A folder 306a, Project B folder 306b, Project C folder 307c, File 001 308a, and File 002 308b. Project A folder 306a has child folder and files comprising Pre process folder 310a, Core folder 310b, Post Process folder 310c, File 101 312a, and File 102 312b. Pre process folder 310a has child folders and/or files identified by folders and files under Project A 322.

In the example of FIG. 3, a Project A folder 306a can have the following structured attributes and unstructured attributes. A folder depth 314 of Project A folder 306a can be 3. A folder width 320 of Project A folder 306a can be 5. A count of files of Project A folder 306a can be 3. A count of folders of Project A folder 306a can be 4. A count of neighbor files 318 of Project A folder 306a can be 2. A count of neighbor folders 316 of Project A folder 306a can be 2. In some examples, these numerical values can be considered to be structured attributes of Project A folder 306a.

A folder name of Project A folder 306a can be "Project A." A father folder's name of Project A folder can be "Projects." A neighbor folders' names of Project A folder 306a can be {"Project B"; "Project C"}. A direct subfolders' names of Project A folder 306a can be {"Pre process", "Core", "Post process"}. In some examples, these text strings associated with Project A folder 306a can be considered to be unstructured attributes of Project A folder 306a.

It can be appreciated that there can be other examples that utilize different structured attributes and/or unstructured attributes.

Structured and unstructured attributes can be translated to a vector of features (such as in feature extraction 206 of FIG. 2), which can then be used as input to an AI model (e.g., trained AI model 210). In some examples, structured attributes can be used as AI model inputs directly, since they are already represented as numbers. In some examples, unstructured attributes are converted from strings (or lists of strings) into numbers, or features, before being provided to an AI model.

FIG. 4 illustrates an example vector 400 of structured attributes of a folder, that can facilitate artificial intelligence-based storage monitoring, in accordance with certain embodiments of this disclosure. Example vector 400 can be generated based on structured attributes of Project A folder 306a of FIG. 3. In some examples, vector 400 can be provided as input to trained AI model 210 of FIG. 2 to determine which folders to place on a watch list.

Element 1.a 402 of vector 400 can have a value of 3, and represent a folder depth 314 of Project A folder 306a of FIG. 3. Element 1.b 404 of vector 400 can have a value of 5, and represent a folder width 320 of Project A folder 306a of FIG. 3. Element 1.c 406 of vector 400 can have a value of 3, and represent a count of files of Project A folder 306a of FIG. 3. Element 1.d 408 of vector 400 can have a value of 4, and represent a count of folders of Project A folder 306a of FIG. 3. Element 1.e 402 of vector 400 can have a value of 2, and represent a count of neighbor files 318 of Project A folder 306a of FIG. 3. Element 1.f 402 of vector 400 can have a value of 2, and represent a count of neighbor folders 316 of Project A folder 306a of FIG. 3.

FIG. 5 illustrates an example vector 500 of unstructured attributes of a folder, that can facilitate artificial intelligence-based storage monitoring, in accordance with certain embodiments of this disclosure. Example vector 500 can be generated based on structured attributes of Project A folder 306a of FIG. 3. In some examples, vector 500, which can store unstructured attributes as text values, can be used to determine vector 602b of FIG. 6 and vector 706c of FIG. 7, which can store unstructured attributes as numerical values. Then vector 602b of FIG. 6 and vector 706c of FIG. 7 can be provided as input to trained AI model 210 of FIG. 2.

Element 2.a 502 of vector 500 can have a value of "Project A", and represent a name of Project A folder 306a of FIG. 3. Element 2.b 504 of vector 500 can have a value of "Projects", and represent a name of a parent folder (Projects folder 304) of Project A folder 306a of FIG. 3. Element 2.c 506 of vector 500 can have a value of {"Project B", "Project C"}, and represent a name siblings (Project B folder 306b and Project C folder 306c) of Project A folder 306a of FIG. 3. Element 2.d 508 of vector 500 can have a value of {"Pre process", "Core", "Post process"}, and represent a name of children (Pre process folder 310a, Core folder 310b, and Post process folder 310c) of Project A folder 306a of FIG. 3.

FIG. 6 illustrates example vectors 600 of unstructured attributes of a folder, that can facilitate artificial intelligence-based storage monitoring, in accordance with certain embodiments of this disclosure. Example vectors 600 comprises vector 602a and vector 602b. In turn, vector 602a comprises rows 604a and columns 606a, and vector 602b comprises rows 604b and columns 606b. In some examples, vector 602b can be provided as input to trained AI model 210 of FIG. 2.

Vector 602a can represent vector 500 of FIG. 5 after the text of vector 500 has been converted to numerical values. Vector 602b can represent vector 602a after numerical values for each row/column pair of vector 602a have been combined.

In vector 602a, rows 604a correspond to the rows of vector 500. Then, columns 606a of vector 602a correspond to the text values found in vector 500 (e.g., "Project", "A", "Projects", etc.). For instance, in element 2.a 502 of vector 500, the text "Project A" is contained. Then, in the corresponding row for 2.a in rows 604a, a value of 1 is shown in the column of columns 606a for "project" (corresponding to one occurrence of that word), and a value of 1 is shown in the column for "A" (corresponding to word occurrence of that word). No numerical values are in any of the other columns for this row, because none of those words are found in element 2.a 502.

These numerical values for rows 604a of vector 602a are combined in rows 604b in vector 602b. For example, 2.c of rows 604a has two values −1, and 1 again for column "project" of columns 606a. That is combined to a value of 2 for a corresponding row 604b and column "project" of columns 606b. This resulting vector—vector 602b—can be a two-dimensional vector that numerically represents the text values of vector 500 of FIG. 5.

A "bag of words" approach can be utilized to convert unstructured attributes into features. Generally, each attribute can be represented as a bag of terms. Characteristics, or features, determined from a bag-of-words model can be term frequency (i.e., a number of times a term appears in a certain text). A list of terms can be summarized from historical paths. For example, terms taken from vector 500 of FIG. 5 can be {"project", "A", "projects", "B", "C", "pre", "process", "core", "post"}. Using that vector for terms, "Project A" can be represented as {1, 1, 0, 0, 0, 0, 0, 0, 0}, because each of "Project" and "A" appear in the string once, and none of the other terms appear in the string. In some examples, this analysis can be performed in a case-insensitive manner Using this approach, unstructured attributes can be transformed from a string to a vector of integers. Where a list-like unstructured attribute is being analyzed, (e.g., where an unstructured attribute of neighbor folders is {"Project B"; "Project C"}), a resulting vector can be a sum of all terms in the list. In some examples, delimiters beyond a space are utilized, such as a delimiter of "_." Where such a delimiter is used, "project can be recognized from both "Project A" and "Project_A."

In some examples, a bag-of-words approach can group different words that have similar meanings—e.g., "project" and "projects." Similarly, "pre" and "post" can have a similar usage where they are used to describe a term such as "process."

Where there are two folders named "pre process" and "post process," they can be likely to include different stages of one project. In natural language processing (NLP) techniques, a word can have a distance, or similarity, with other words according to a corpus feeding to a language model.

Figure 7:
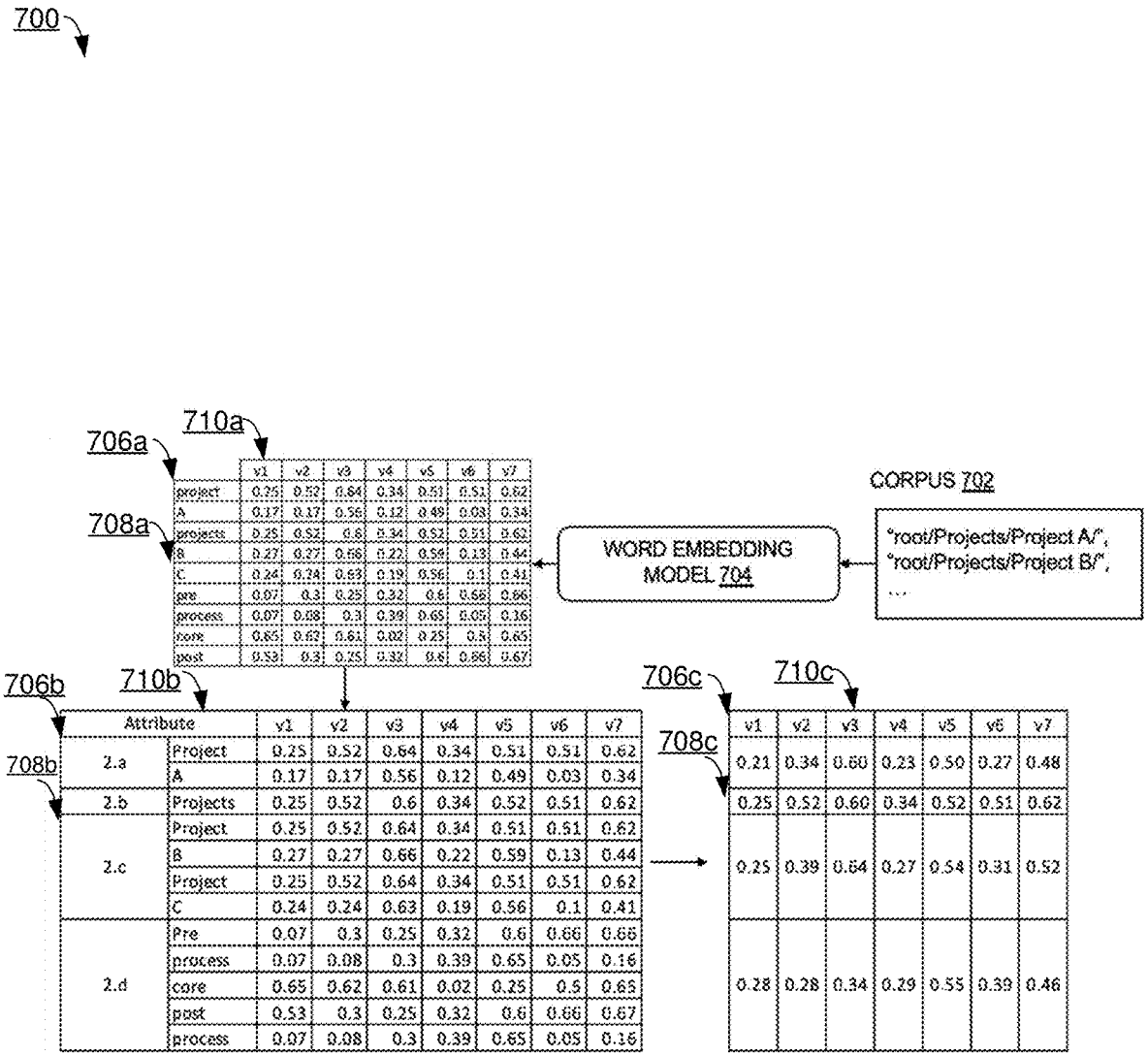
FIG. 7 illustrates additional example vectors of unstructured attributes of a folder that are converted to numerical values, that can facilitate artificial intelligence-based storage monitoring, in accordance with certain embodiments of this disclosure.

FIG. 7 illustrates additional example vectors 700 of unstructured attributes of a folder, that can facilitate artificial intelligence-based storage monitoring, in accordance with certain embodiments of this disclosure. In some examples, vector 706c can be provided as input to trained AI model 210 of FIG. 2.

Example vectors 700 comprises corpus 702, word embedding model 704, vector 706a, vector 706b, and vector 706c. In turn, vector 706a comprises rows 708a and columns 710a; vector 706b comprises rows 708b and columns 710b; and vector 706c comprises rows 708c and columns 710c.

Vector 706c can represent vector 500 of FIG. 5 after the text of vector 500 has been converted to numerical values. Vector 706a can represent a vector output by a word embedding model, such as word embedding model 704. Vector 706b can represent the values of vector 706a after they have been mapped to corresponding rows of vector 500. Vector 706c can represent the values of vector 706b after multiple values for a row have been combined.

Corpus 702 can comprise a list of folder paths of a file system such as file system hierarchy 100 of FIG. 1. Example folder paths can be "root/Projects/Project A/" and "root/Projects/Project B." The text of these folder paths can correspond to values for unstructured attributes in vector 500—e.g., folder path "root/Projects/Project A/" has the text "Project A" that also appears in vector 500.

Corpus 702 can be used as input to word embedding model 704. Word embedding model 704 can take corpus 702 as input and produce as output a mapping of a two-dimensional array that has rows 708a that represents different text strings from corpus 702, and columns 710a that represents associated dimensions for those text strings in corpus 702, as determined by word embedding model 704.

Vector 706a can then be transformed into vector 706b. Rows 708a and columns 710a of vector 706a can be similar to rows 708b and columns 710b of vector 706b. Additionally, in vector 708b, rows are mapped to corresponding rows of vector 500 of FIG. 5. For example, row 506 of vector 500 contains the text "Project", "B", "Project", and "C". Then, there are corresponding entries in rows 708b of vector 708b for 2.c of rows 708b.

Vector 708b can then be transformed into vector 708c. Rows 708b and columns 710b of vector 706b can be similar to rows 708c and columns 710c of vector 706c. Similar to the transform from vector 602a to vector 602b in FIG. 6, in vector 706c multiple values that correspond to a row can be averaged together. For instance, the values that correspond to 2.a of rows 708b and v1 of columns 710b (values 0.25 and 0.17) can be averaged together (to produce 0.21) in vector 706c. This resulting vector, vector 706c, comprises a two-dimensional vector that numerically represents the text values of vector 500 of FIG. 5.

To consider a nature of language of unstructured attributes, a word embedding approach can be utilized. In a word embedding approach of natural language processing (NLP), a corpus (e.g., corpus 702) can be fed to a NLP model (e.g., word embedding model 704), from which the NLP model can map words or phrases from the corpus to vectors of real numbers (e.g., vector 706a). For example, a path to a folder can be used as a sentence in a corpus. That is, a path to a folder such as "root/Projects/Project A", or "root/home/user_001". Delimiters can be defined (such as "/" and "_") to divide a path name into multiple words, similar to a sentence. Then, a word embedding approach can be utilized to transform each word into a vector of numbers.

In the example of FIG. 7, a list of all folder paths can be fed to a word embedding model (such as a word2vec model). The model can output a mapping matrix (e.g. vector 706a), which maps each term to a vector of numbers. For example, the term "project" can be represented as (0.25, 0.52, 0.64, 0.34, 0.51, 0.51, 0.52). These seven numbers can be associated with seven dimensions, named v1-v7. These dimensions can be generated from a word embedding model.

While a bag-of-words approach can use the terms directly as dimensions (e.g., "project" or "A"), a word embedding approach can use the transforms of the terms as dimensions. This can be similar to a coordinate projection from one space to another. In the new dimension space (v1-v7), similar terms can be close to each other. That is, "project" and "projects" can be close to each other, and "pre" and "post" can be close to each other. In this context, "close" can indicate that their vectors of numbers can be similar. Then, for each attribute in 2.a-2.d of vector 500 of FIG. 5, a vector can be used to represent it, as in vector 706b. Where there is a list of terms, an average of the vectors of the terms can be taken to create one vector, as in vector 706c.

With an approach to convert unstructured attributes into features (e.g., a bag-of-words approach, or a word embedding approach), when unstructured attributes are turned into a vector of numbers, they can then be handled in a similar manner as structured attributes. After a transformation process, the resulting vectors can be joined to create a longer vector, and this longer vector can be used to characterize the folder in question.

Using such an approach, folders in historical data can be characterized as vectors of numbers. Some of the folders can be labelled as "important" because they appear in a historical watch list. Those "important" folders can be used as positive samples, and other folders can be used as negative samples. The positive samples and negative samples can be used as training data for an AI model for classification.

In some examples, different ML classification approaches can be used, such as a linear regression (sometimes referred to as "LR"), a support vector machine (sometimes referred to as "SVR"), tree-based approaches (such as approaches utilizing a decision tree, a random forest, or a xgboost tree), or a neural network based approach.

In some classifier examples, a classifier determines a score in a model, and uses a score threshold to perform a final classification. In the present techniques, the scores determined by a classifier can be utilized by a subsequent module, rather than the final classification.

Figure 8:
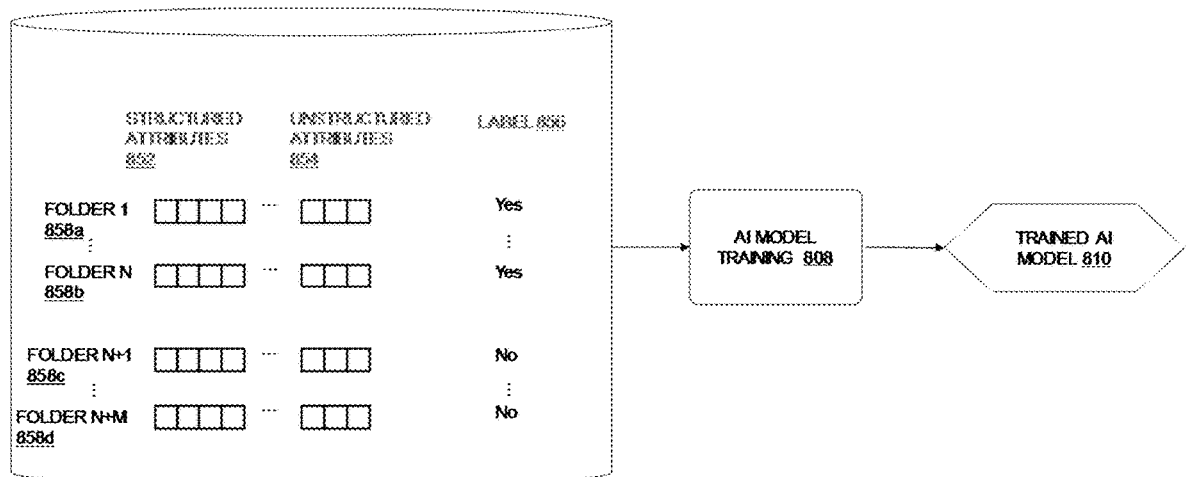
FIG. 8 illustrates an example of training an artificial intelligence classifier, that can facilitate artificial intelligence-based storage monitoring, in accordance with certain embodiments of this disclosure.

FIG. 8 illustrates an example 800 of training an artificial intelligence classifier, that can facilitate artificial intelligence-based storage monitoring, in accordance with certain embodiments of this disclosure. In some examples, example 800 can be utilized to train trained AI model 210 of FIG. 2.

Example 800 comprises historical data 802, AI model training 808, and trained AI model 810. In turn, historical data 802 comprises a plurality of folders (folder 858a, folder 858b, folder 858c, and folder 858d), each having structured attributes 852 and unstructured attributes 854, and labels 856 of whether the folder was previously identified as interesting.

Structured attributes 852 can be structured attributes such as discussed with respect to vector 400 of FIG. 4. Unstructured attributes can be unstructured attributes such as discussed with respect to vector 500 of FIG. 5, vectors 600 of FIG. 6, and vectors 800 of FIG. 8. A corresponding label of labels 856 can, for example, be Yes when a folder was previously included in a watch list or otherwise determined to be interesting in the historical data, and No otherwise.

Historical data 802 can be similar to historical data 202 of FIG. 2. AI model training 808 can be similar to AI model training 208 of FIG. 2. Trained AI model 810 can be similar to trained AI model 210 of FIG. 2.

FIG. 9 illustrates an example 900 of selecting folders for a watch list, that can facilitate artificial intelligence-based storage monitoring, in accordance with certain embodiments of this disclosure. Example 900 comprises a plurality of folders (folder 902, folder 902b, folder 902c, folder 902d, and folder 902e) along with how they are evaluated according to various metrics in two different evaluative iterations (iteration K−1 910, and iteration K 912). These iterations of FIG. 9 can be performed by trained AI model 210 of FIG. 2 as part of using artificial intelligence to determining folders to place on a watch list.

In iteration K−1 910, the folders are evaluated according to an importance score 914, importance threshold 916, whether they are currently in the watch list 918, and whether they exhibit abnormal behavior 920. In iteration K 912, the folders are evaluated according to importance score 922, importance threshold 924, and whether they are in the watch list 926.

An importance score in importance score 914 and importance score 922 can be determined according to a trained AI model, such as trained AI model 210 of FIG. 2. An importance threshold in importance threshold 916 and importance threshold 924 can be a threshold value for an importance score for the corresponding folder to be determined to be important.

An importance score can have a default value—in this example, the default value can be 0.5—and then this default value can be modified. In example 900, an importance threshold can be modified where a folder is in a watch list, and then is determined to have abnormal behavior. For example, in iteration K−1 910, folder 902a, folder 902b, and folder 902c have an importance threshold of 0.5. But folder 902a is evaluated for abnormal behavior because it is in the watch list, and identified to have such abnormal behavior (e.g., IOPS above a threshold value). As such, in the next iteration—iteration K 912—the importance score for folder 902a and its child folders (folder 902b and folder 902c) can be lowered from 0.5 to 0.4.

A subsequent module that can utilize scores determined by a classifier, such as trained AI model 210 of FIG. 2, can be an interesting folder detector module. In an interesting folder detector module, a "smart" threshold (or multiple thresholds) can be determined to filter the folders identified to a smaller list of interesting folders. That is, a list of candidate folders and corresponding importance scores can be received from a first module. A second module that receives this list can determine a "smart" threshold or multiple thresholds to filter out a subset list of interesting folders.

In some examples, watch list monitoring can be performed with an iterative loop (e.g., iteration K−1 910 and iteration K 912). In each loop, the watch list can be updated. In one iteration of a loop, a system monitor can have already generated statistics of folder activities for a previous iteration of the loop—i.e., folders in the previous iteration watch list (where the folders in a watch list can change between iterations) have already been monitored and had statistics reported for them.

An anomaly detection submodule can be utilized to determine one or more abnormal folders of the folders of a watch list from a previous iteration of the loop (as shown in abnormal? 820). What constitutes an anomaly can include folders with a largest throughput, IOPS, or latency, among other things. User input can be received that defines what constitutes an anomaly.

When a folder is contained on watch list determined from a previous iteration of the loop (e.g., iteration K−1 910), that can indicate that the folder has been determined to be important based on its structured and unstructured attributes. If such an important folder is also determined to be abnormal (for example, based on activity relating to that folder), then it can be determined that this important-and-abnormal folder is critical, and should be monitored in a watch list. In some examples, such an important-and-abnormal folder should be more likely to be selected for a watch list in a current iteration of the loop than otherwise.

Furthermore, a root cause analysis (RCA)-driven use case can involve paying more attention to subfolders, in order to find where the abnormal behavior is occurring. Given that, in some examples, both abnormal folders and their subfolders can be given a larger weight in a watch-list decision. In other examples, such abnormal folders and their subfolders can have a threshold-to-be-determined-important reduced.

An approach to determining interesting folders can be to: collect statistics of activities of folders on a previous watch list; determine which of those folders has abnormal statistics; for a folder list with importance, set a threshold as a general predefined threshold (e.g., 0.5 where importance can range between 0 and 1); for an abnormal folder, set a threshold lower than the general predefined threshold (e.g., 0.4 where the general predefined threshold is 0.5), and determine a folder to be interesting where its importance score is greater than its threshold number.

Depicted are two consecutive iterations of a loop—iteration K−1 910, and iteration K 912. In iteration K−1 910, importance scores for each folder can be determined. In an example where iteration K−1 910 is an initial iteration of the loop, an importance threshold can be set to 0.5 for each folder. Then, each folder that has an importance score above its importance threshold can be selected for the watch list. In this example, folder 902a ("Project_001/"), folder 902d ("Project_002/"), and folder 902e ("Project_003/") are selected in the watch list in iteration K−1 910.

In iteration K 912, the monitoring statistics from iteration K−1 910 can be determined—i.e., the monitoring statistics of folder 902a ("Project_001/"), folder 902d ("Project_002/"), and folder 902e ("Project_003/") that were selected for the watch list in iteration K−1. In an example, suppose that folder 902a ("Project_001/") has a largest throughput of these three folders, so it is labelled as "abnormal." Then, in iteration K 912, the importance threshold for folder 902a ("Project_001/") and its subfolders (folder 902b and folder 902c) can be decreased from 0.5 in iteration K−1 910 to 0.4 in iteration K 912 here.

The importance scores for the folders can be determined again in iteration K 910. Importance scores can change between iterations because attributes of folders (e.g., width, count of folders, or count of files) can change. A new watch list can then be determined by comparing a folder's current importance score with its current importance threshold. As a result, in iteration K−1 910, folder 902a ("Project_001"), folder 902b ("Project_001/A/"), folder 902c ("Project_001/B/"), and folder 902d ("Project_002/") can be selected for the watch list.

After updating a watch list by performing an iteration of the loop, which folders are included in the watch list can be further refined in another module.

One approach for refining which folders are included in the watch list can be pruning. In pruning, excessive overlap in folders' paths can be reduced. A watch list can contain several paths that share the same terms, e.g., "root/Projects/Project A/", "root/Projects/Project A/Core", "root/Projects/Project A/Core/subfolder_1", and "root/Projects/Project A/Core/subfolder_1/subfolder_1_1". It is possible that each of these paths has an importance score higher than its importance threshold, so they are each determined to be interesting for a new watch list.

Such a list can be pruned as follows. Selected folders can be grouped by their hierarchy. A group with a high overlap can be selected, where an overlap of a group can be indicated by a count of the folders in the group divided by a maximum depth of the folders. For each group with a high overlap, N folders can be selected that have a highest importance delta as the final selected folders. An importance delta can be determined as a folder's importance score minus its importance threshold. As used herein, N can be a predefined number. For example, N can be set at 3 in examples where there are 10 overlapped folders in a group.

Another approach for refining which folders are included in the watch list can be lagging. With a lagging approach, results for a folder watch list can be smoothed between iterations of the loop. That is, an amount of change between folders contained in folder watch lists in two successive iterations of the loop can be limited. In some examples, a change to which folders are part of a watch list can confuse users. This user confusion can exist where a user sets the loop to iterate on a short time period (e.g., 12 hours or 24 hours), and then the user finds that folders are frequently appearing and disappearing from the watch list.

To avoid such a scenario, a user can set the iteration loop interval to a greater time period, or a lagging approach can be utilized. In a lagging approach, a delay can be added between generating a watch list, and using the watch list. When a folder is determined to be important in multiple iterations of a watch list (the threshold number of iterations can be predetermined), then that folder can be selected for the watch list.

There can be other approaches utilized to refine the folders of a watch list. Such approaches can include manual adjustment of the folders in a watch list by a user.

Example Process Flows

Figure 10:
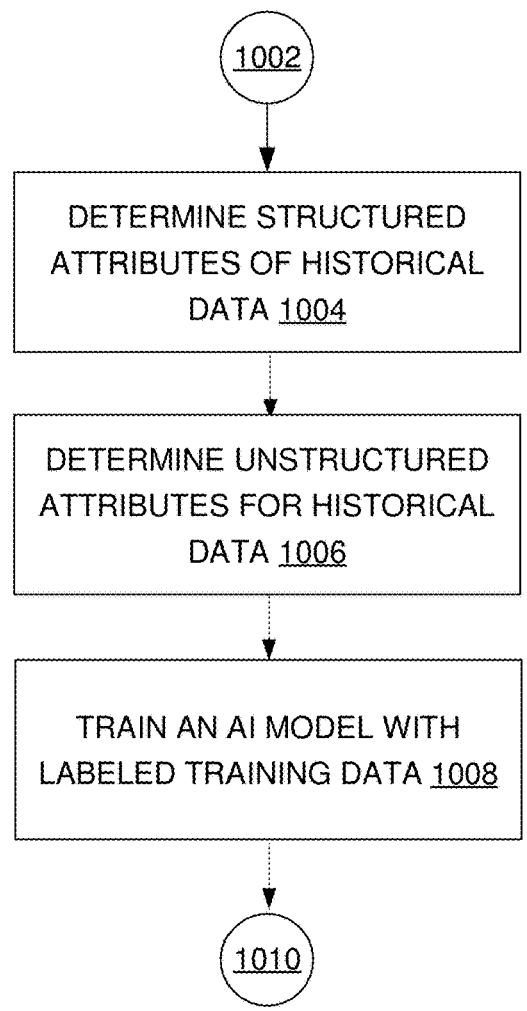
FIG. 10 illustrates an example process flow that can facilitate training a classifier for artificial intelligence-based storage monitoring, in accordance with certain embodiments of this disclosure.

FIG. 10 illustrates an example process flow 1000 that can facilitate training a classifier for artificial intelligence-based storage monitoring, in accordance with certain embodiments of this disclosure. In some examples, aspects of process flow 1000 can be implemented by computing environment 1500 of FIG. 15. In some examples, aspects of process flow 1000 can be used to implement aspects of AI model training 208 of FIG. 2.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with aspects of one or more of process flow 1100 of FIG. 11, process flow 1200 of FIG. 12, process flow 1300 of FIG. 13, and process flow 1400 of FIG. 14.

Process flow 1000 begins with 1002, and moves to operation 1004. Operation 1004 depicts determining structured attributes of historical data. In some examples, structured attributes of historical data can be determined in a manner similar to that described with respect to FIG. 4. After operation 1004, process flow 1000 moves to operation 1006.

Operation 1006 depicts determining unstructured attributes for historical data. In some examples, structured attributes of historical data can be determined in a manner similar to that described with respect to FIGS. 5-7. After operation 1004, process flow 1000 moves to operation 1006.

Operation 1008 depicts training an AI model with labeled training data. In some examples, training an AI model can be performed in a similar manner as discussed with respect to AI model training 208 of FIG. 2, and can produce a trained AI model classifier such as trained AI model classifier 210 of FIG. 2. The unstructured attributes of operation 1004 and the structured attributes of operation 1006 can be provided as part of the labeled training data. The labeled training data can also include an indication of whether a folder in the training data was previously placed on a watch list, similar to in watch list? 918 of FIG. 9. After operation 1008, process flow 1000 moves to 1010, where process flow 1000 ends.

Figure 11:
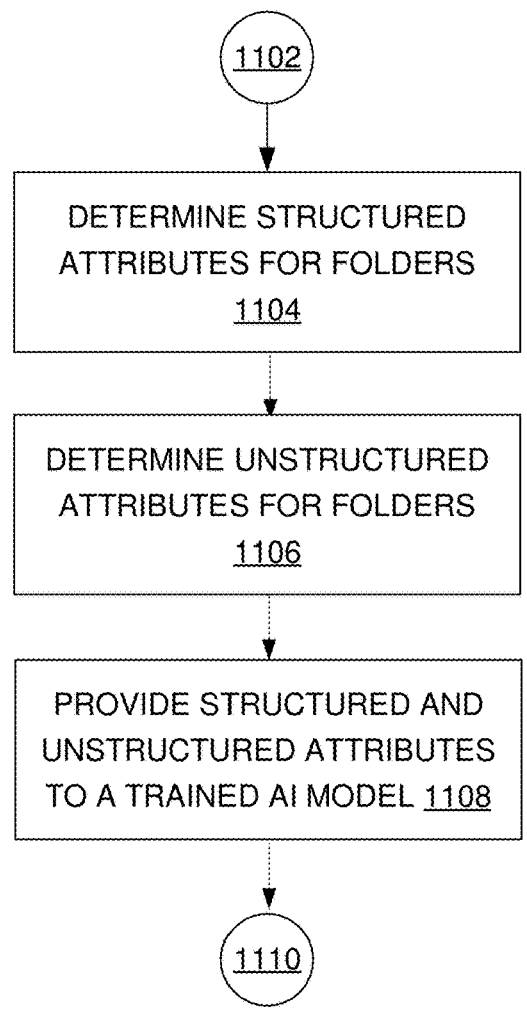
FIG. 11 illustrates an example process flow that can facilitate using a classifier for artificial intelligence-based storage monitoring, in accordance with certain embodiments of this disclosure.

FIG. 11 illustrates an example process flow 1100 that can facilitate using a classifier for artificial intelligence-based storage monitoring, in accordance with certain embodiments of this disclosure. In some examples, aspects of process flow 1100 can be implemented by computing environment 1500 of FIG. 15. In some examples, aspects of process flow 1100 can be used to implement aspects of trained AI model 210 of FIG. 2.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with aspects of one or more of process flow 1000 of FIG. 10, process flow 1200 of FIG. 12, process flow 1300 of FIG. 13, and process flow 1400 of FIG. 14.

A classifier used to implement process flow 1100 can be a classifier trained in process flow 1000 of FIG. 10, and in some examples can be similar to trained AI model 210 of FIG. 2.

Process flow 1100 begins with 1102, and moves to operation 1104. Operation 1104 depicts determining structured attributes for folders. In some examples, structured attributes of historical data can be determined in a manner similar to that described with respect to FIG. 4. These folders can be current folders of a file system hierarchy that will have folders on a watch list, such as file system hierarchy 200 of FIG. 2. After operation 1104, process flow 1100 moves to operation 1106.

Operation 1106 depicts determining unstructured attributes for folders. In some examples, structured attributes for folders can be determined in a manner similar to that described with respect to FIGS. 5-7. After operation 1106, process flow 1100 moves to operation 1108.

Operation 1108 depicts providing structured and unstructured attributes to a trained AI model. In some examples, the structured and unstructured attributes can be provided to a trained AI model similar to how trained AI model 210 of FIG. 2 accepts input. An output can then be a numerical value for each folder that indicates that folder's importance. After operation 1108, process flow 1100 moves to 1110, where process flow 1100 ends.

Figure 12:
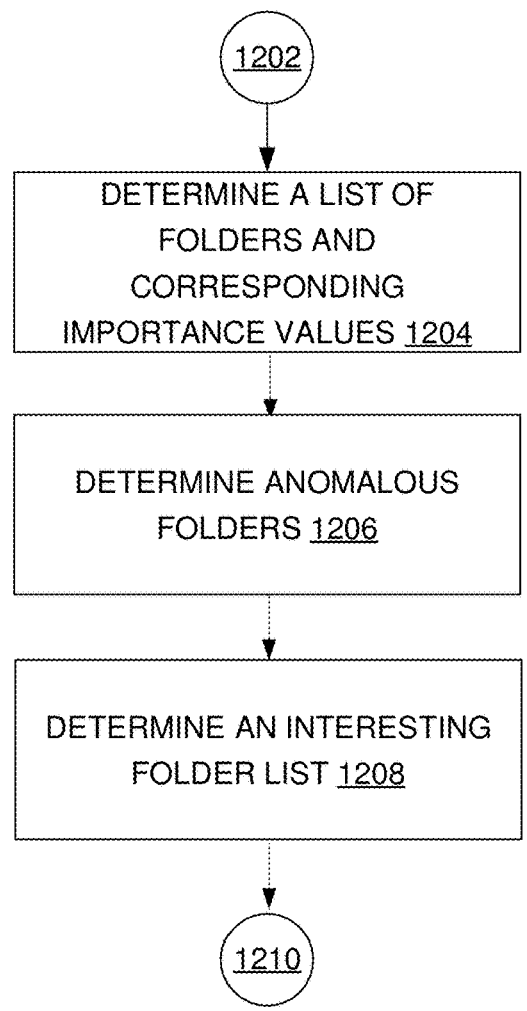
FIG. 12 illustrates an example process flow that can facilitate determining interesting folders for artificial intelligence-based storage monitoring, in accordance with certain embodiments of this disclosure.

FIG. 12 illustrates an example process flow 1200 that can facilitate determining interesting folders for artificial intelligence-based storage monitoring, in accordance with certain embodiments of this disclosure. In some examples, aspects of process flow 1200 can be implemented by computing environment 1500 of FIG. 15. In some examples, aspects of process flow 1200 can be implemented by anomaly detection 214 of FIG. 2 and interesting folder detector 218 of FIG. 2.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with aspects of one or more of process flow 1000 of FIG. 10, process flow 1100 of FIG. 11, process flow 1300 of FIG. 13, and process flow 1400 of FIG. 14.

Process flow 1200 begins with 1202, and moves to operation 1204. Operation 1204 depicts determining a list of folders and corresponding importance values. This can comprise anomaly detection 214 of FIG. 2 and interesting folder detector 218 of FIG. 2 receiving folder list with folder importance 212 of FIG. 2. After operation 1204, process flow 1200 moves to operation 1206.

Operation 1206 depicts determining anomalous folders. Determining anomalous folders can be performed in a similar manner as described with respect to anomaly detection 214 of FIG. 2. After operation 1206, process flow 1200 moves to operation 1208.

Operation 1208 depicts determining an interesting folder list. Determining an interesting folder list can be done in a similar manner as described with respect to interesting folder detector 218 of FIG. 2. Determining an interesting folder list in operation 1208 can be performed based on determining anomalous folders in operation 2106 and determining a folder list with folder importance such as described with respect to folder list with folder importance 212 of FIG. 2. After operation 1208, process flow 1200 moves to 1210, where process flow 1200 ends.

Figure 13:
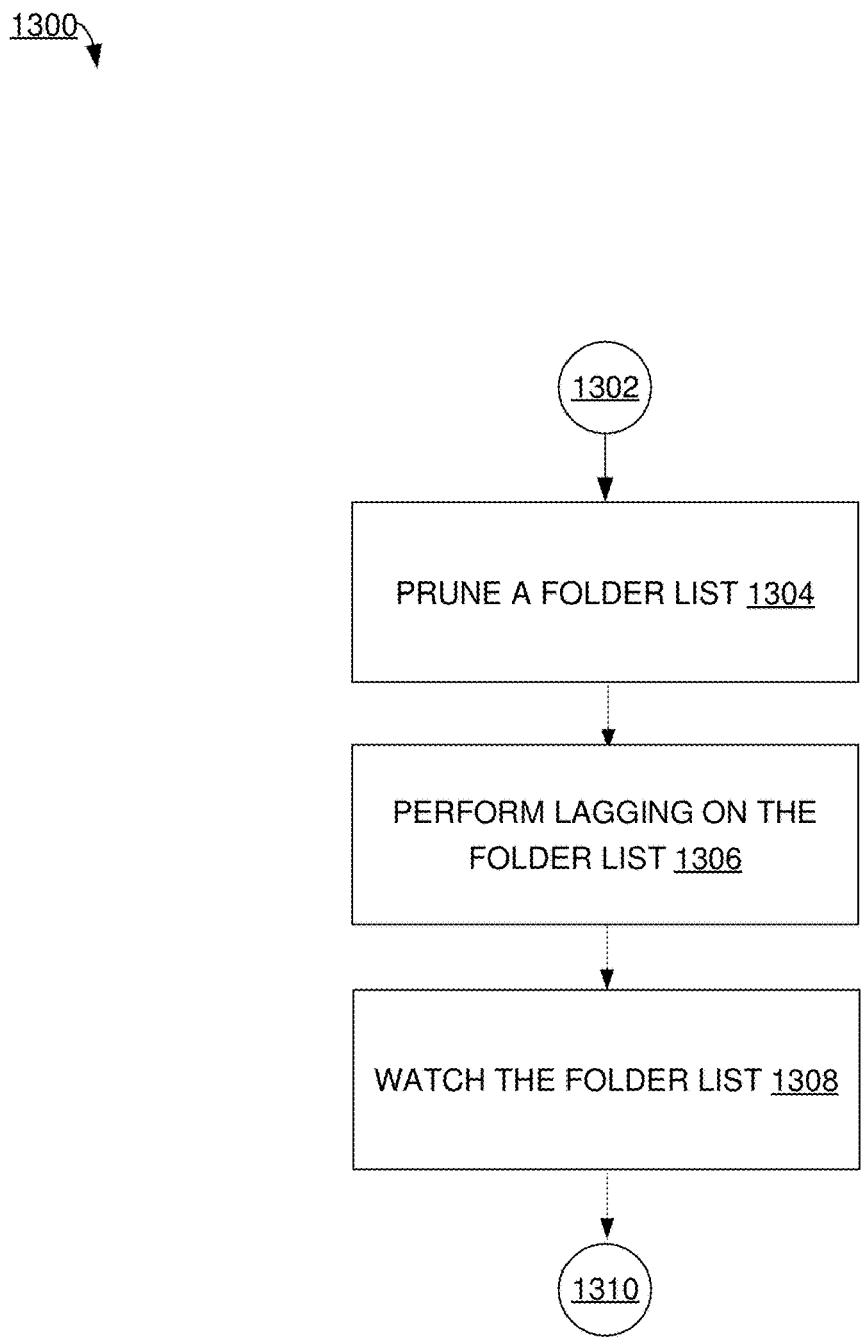
FIG. 13 illustrates an example process flow that can facilitate refining interesting folders for artificial intelligence-based storage monitoring, in accordance with certain embodiments of this disclosure.

FIG. 13 illustrates an example process flow 1300 that can facilitate refining interesting folders for artificial intelligence-based storage monitoring, in accordance with certain embodiments of this disclosure. In some examples, aspects of process flow 1300 can be implemented by computing environment 1500 of FIG. 15. In some examples, aspects of process flow 1300 can be used to implement refinement 222 of FIG. 2 and watch list based system monitor 226 of FIG. 2.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with aspects of one or more of process flow 1000 of FIG. 10, process flow 1100 of FIG. 11, and process flow 1200 of FIG. 12.

Process flow 1300 begins with 1302, and moves to operation 1304. Operation 1304 depicts pruning a folder list. In some examples, pruning a folder list can be performed in a similar manner as pruning a folder list as described with respect to FIG. 9. After operation 1304, process flow 1300 moves to operation 1306.

Operation 1306 depicts performing lagging on the folder list. In some examples, performing lagging on the folder list can be performed in a similar manner as performing lagging on a folder list as described with respect to FIG. 9. After operation 1306, process flow 1300 moves to operation 1308.

Operation 1308 depicts watching the folder list. Watching the folder list can comprise monitoring the folders for specified types of changes, and providing a notification to a user that a specified type of change has been identified for a particular folder. After operation 1308, process flow 1300 moves to 1308, where process flow 1300 ends.

Figure 14:
FIG. 14 illustrates an example process flow that can facilitate artificial intelligence-based storage monitoring, in accordance with certain embodiments of this disclosure.

FIG. 14 illustrates an example process flow 1400 that can facilitate artificial intelligence-based storage monitoring, in accordance with certain embodiments of this disclosure. In some examples, aspects of process flow 1400 can be implemented by computing environment 1500 of FIG. 15. In some examples, aspects of process flow 1400 can be used to system architecture 200 of FIG. 2.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with aspects of one or more of process flow 1000 of FIG. 10, process flow 1100 of FIG. 11, process flow 1200 of FIG. 12, and process flow 1300 of FIG. 13.

Process flow 1400 begins with 1402, and moves to operation 1404. Operation 1404 depicts determining a first attribute of a first folder in a computer file system.

In some examples, the first attribute comprises at least a first structured attribute and a first unstructured attribute. That is, a folder can comprise structured attributes and/or unstructured attributes. A structured attribute can comprise a numerical statistic of the folder. An unstructured attribute can comprise a text string corresponding to the first folder, such as a path name of the first folder. Attributes can be those such as described with respect to FIG. 3.

Operation 1406 depicts converting the first attribute into a first vector of attributes. In some examples, operation 1406 comprises converting a first attribute of a first folder in a file system into a first vector of attributes. Operation 1406 can be implemented in a similar manner as described with FIGS. 4-7.

Operation 1408 depicts outputting the first vector of attributes to an artificial intelligence classifier that outputs a first classification of the first folder, the first classification indicating that the first folder is assigned a first importance value. This outputting can be similar to folder list with folder importance 212 of FIG. 12 that is output by trained AI model 210.

In some examples, operation 1408 comprises providing the first vector of attributes as input to an artificial intelligence classifier that outputs a first classification of the first folder, the first classification indicating that the first folder has a first importance value. In some examples, operation 1408 comprises sending a first vector of attributes of a first folder in a file system to an artificial intelligence classifier that outputs a first classification of the first folder, the first classification indicating that the first folder has a first importance value.

In some examples, operation 1408 can comprise training the artificial intelligence classifier with labeled training data, the labeled training data comprising historical folders and corresponding indications of whether each historical folder was monitored for changes. That is, the artificial intelligence classifier can first be trained before it classifies folders of the computer file system. This classifier can comprise labeled training data comprising folders and a corresponding label of whether or not the folder was included in a watch list. This training data can be historical data from the computer system, where folders were marked for a watch list based on user input indicating that.

Operation 1410 depicts, in response to determining that the first importance value is above a first defined threshold for the first folder, monitoring the first folder for changes. The first folder can be part of final folder list 224 of FIG. 2, the folders of which are then watched by watch list based system monitor 226.

In some examples, operation 1410 comprises, in response to determining that the first importance value is above a first predetermined threshold for the first folder, monitoring the first folder for changes.

In some examples, monitoring the first folder comprises including the first folder in a first watch group. In such examples, operation 1410 can comprise monitoring activity of a second folder that is a member of a second watch group, the second watch group being determined previously to determining the first watch group; and including the second folder in the first watch group based on the monitoring activity of the second folder. That is, anomaly detection of a previous iteration's watch list can be performed.

In some examples, the activity of the second folder comprises a throughput relating to the second folder, an input/output operations per second relating to the second folder, or a latency of accessing data relating to the second folder. This kind of activity can be considered abnormal, and lead to an increase in the chance that a folder will be selected for a watch list.

In some examples of operation 1410, the including the second folder in the first watch group comprises increasing a second importance value of the second folder, resulting in an increased second importance value, the increased second importance value being determined to be above a second defined threshold value. That is, a way to handle an abnormal folder can be to increase its importance value.

In some examples of operation 1410, the including the second folder in the first watch group comprises decreasing a second defined threshold value, resulting in a decreased second threshold value, a second importance value associated with the second folder being determined to be above the decreased second defined threshold value. That is, another way to handle an abnormal folder can be to decrease its associated threshold value.

In some examples where the monitoring the folder comprises including the first folder in a first watch group, operation 1410 can include performing iterations of updating the first watch group at a defined time interval. That is, the watch list can be updated by performing iterative loops of determining which folders to place on the watch list.

In some examples, the first folder belongs to a set of candidate folders, and operation 1410 can comprise reducing the set of candidate folders to a set of watch list folders, a first number of folders in the set of candidate folders being larger than a second number of folders in the set of watch list folders; and monitoring the set of watch list folders for changes. That is, a set of candidate folders that have been labelled interesting can be refined into a final set of folders that are on the watch list.

In some examples, reducing the set of candidate folders to the set of watch list folders comprises smoothing changes to the set of watch list folders relative to a set of previous watch list folders. That is, the set of watch list folders across iterations can be smoothed so that not too many folders are added or removed from a watch list.

In some examples, reducing the set of candidate folders to the set of watch list folders comprises implementing a delay between the generating the set of watch list folders and the monitoring the set of watch list folders. That is, a delay can be implemented between generating a watch list and monitoring that watch list. Where folders rapidly enter and exit the watch list, these folders can either be included in the watch list or excluded from the watch list for a period of time, so that the set of folders in the watch list does not change too rapidly.

In some examples, reducing the set of candidate folders to the set of watch list folders comprises monitoring a second folder for changes in response to determining that the second folder is included in a defined number of iterations of the set of watch list folders. That is, a folder can be monitored where it has been included in watch list for N consecutive iterations.

In some examples, the reducing the set of candidate folders to the set of watch group folders comprises omitting a second folder that is in the set of candidate folders from the set of watch group folders in response to determining that the second folder and a third folder of the set of watch group folders have a respective file path that overlaps by at least a second threshold value. That is, pruning refinement as described herein can be implemented on a set of interesting folders to determine the watch list folders. Pruning can occur where multiple files have overlapping paths.

In some examples, pruning comprises determining to perform the omitting the second folder in response to determining that a first difference between a second importance value of the second folder and a second predetermined threshold of the second folder is less than a third importance value of the third folder and a third predetermined threshold of the third folder. That is, the pruning can be based on importance deltas (the difference between their importance score and their associated importance threshold) of the folders, with the folders with the lowest importance deltas being pruned.

Example Operating Environment

Figure 15:
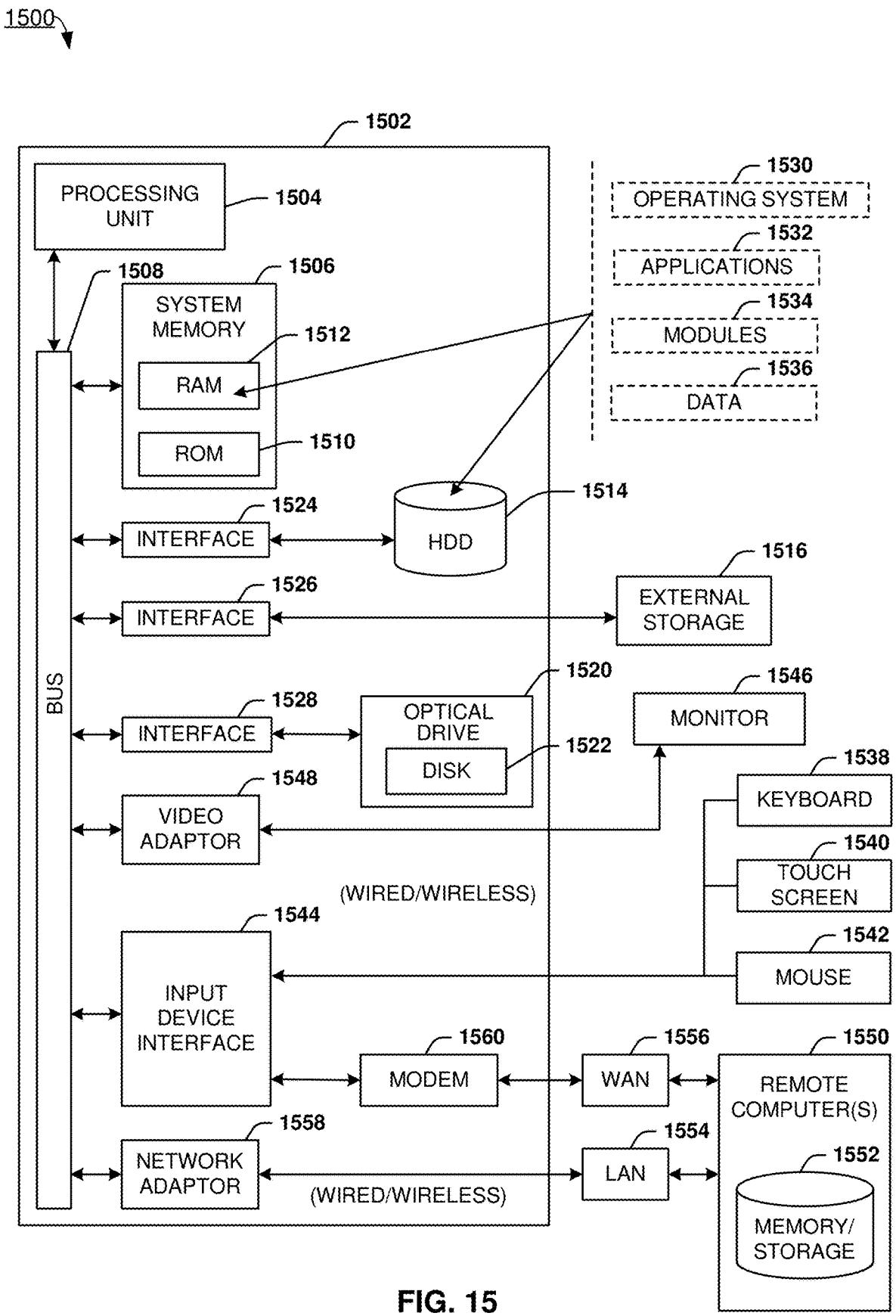
FIG. 15 illustrates an example block diagram of a computer operable to execute certain embodiments of this disclosure.

In order to provide additional context for various embodiments described herein, FIG. 15 and the following discussion are intended to provide a brief, general description of a suitable computing environment 1500 in which the various embodiments of the embodiment described herein can be implemented. For example, aspects of computing environment 1500 can be used to implement aspects of AI model training 208, trained AI model 210, anomaly detection 214, interesting folders detector 218, refinement 222, and/or watch list based system monitor of FIG. 2. In some examples, computing environment 1500 can implement aspects of the process flows of FIGS. 10-14 to facilitate artificial intelligence-based storage monitoring.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1594 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
  a processor; and
  a non-transitory memory that stores executable instructions that, when executed by the first processor, facilitate performance of operations, comprising:
    determining a first attribute of a first folder in a computer file system;
    converting the first attribute into a first vector of attributes;
    outputting the first vector of attributes to an artificial intelligence classifier that outputs a first classification of the first folder, the first classification indicating that the first folder is assigned a first importance value; and
    in response to determining that the first importance value is above a first defined threshold for the first folder, monitoring the first folder for changes.

2. The system of claim 1, wherein the monitoring the first folder comprises including the first folder in a first watch group, and wherein the operations further comprise:
  monitoring activity of a second folder that is a member of a second watch group, the second watch group being determined previously to determining the first watch group; and
  including the second folder in the first watch group based on the monitoring activity of the second folder.

3. The system of claim 2, wherein the activity of the second folder comprises a throughput relating to the second folder, an input/output operations per second relating to the second folder, or a latency of accessing data relating to the second folder.

4. The system of claim 2, wherein the including the second folder in the first watch group comprises increasing a second importance value of the second folder, resulting in an increased second importance value, the increased second importance value being determined to be above a second defined threshold value.

5. The system of claim 2, wherein the including the second folder in the first watch group comprises decreasing a second defined threshold value, resulting in a decreased second threshold value, a second importance value associated with the second folder being determined to be above the decreased second defined threshold value.

6. The system of claim 1, wherein the monitoring the folder comprises including the first folder in a first watch group, and wherein the operations further comprise:
performing iterations of updating the first watch group at a defined time interval.

7. The system of claim 1, further comprising:
training the artificial intelligence classifier with labeled training data, the labeled training data comprising historical folders and corresponding indications of whether each historical folder was monitored for changes.

8. A method, comprising:
converting, by a system comprising a processor, a first attribute of a first folder in a file system into a first vector of attributes;
providing, by the system, the first vector of attributes as input to an artificial intelligence classifier that outputs a first classification of the first folder, the first classification indicating that the first folder has a first importance value; and
in response to determining that the first importance value is above a first defined threshold for the first folder, monitoring, by the system, the first folder for changes.

9. The method of claim 8, wherein the first folder belongs to a set of candidate folders, and further comprising:
reducing, by the system, the set of candidate folders to a set of watch list folders, a first number of folders in the set of candidate folders being larger than a second number of folders in the set of watch list folders; and
monitoring, by the system, the set of watch list folders for changes.

10. The method of claim 9, wherein the reducing the set of candidate folders to the set of watch list folders comprises:
smoothing, by the system, changes to the set of watch list folders relative to a set of previous watch list folders.

11. The method of claim 9, wherein the reducing the set of candidate folders to the set of watch list folders comprises:
implementing, by the system, a delay between the generating the set of watch list folders and the monitoring the set of watch list folders.

12. The method of claim 9, further comprising:
monitoring, by the system, a second folder for changes in response to determining that the second folder is included in a defined number of iterations of the set of watch list folders.

13. The method of claim 8, wherein the first attribute comprises at least a first structured attribute and a first unstructured attribute.

14. The method of claim 13, wherein the first structured attribute comprises a numerical statistic of the folder.

15. A non-transitory computer-readable medium comprising instructions that, in response to execution, cause a system comprising a processor to perform operations, comprising:
sending a first vector of attributes of a first folder in a file system to an artificial intelligence classifier that outputs a first classification of the first folder, the first classification indicating that the first folder has a first importance value; and
in response to determining that the first importance value is above a first predetermined threshold for the first folder, monitoring the first folder for changes.

16. The non-transitory computer-readable medium of claim 15, wherein the operations further comprise:
reducing a set of candidate folders to a set of watch group folders, a first number of folders in the set of candidate folders being larger than a second number of folders in the set of watch group folders; and
monitoring the set of watch group folders for changes.

17. The non-transitory computer-readable medium of claim 16, wherein the reducing the set of candidate folders to the set of watch group folders comprises:
omitting a second folder that is in the set of candidate folders from the set of watch group folders in response to determining that the second folder and a third folder of the set of watch group folders have a respective file path that overlaps by at least a second threshold value.

18. The non-transitory computer-readable medium of claim 17, wherein the operations further comprise:
determining to perform the omitting the second folder in response to determining that a first difference between a second importance value of the second folder and a second predetermined threshold of the second folder is less than a third importance value of the third folder and a third predetermined threshold of the third folder.

19. The non-transitory computer-readable medium of claim 15, wherein the first attribute comprises an unstructured attribute, the unstructured attribute comprising a text string corresponding to the first folder.

20. The non-transitory computer-readable medium of claim 19, wherein the text string corresponding to the first folder comprises a path name of the first folder.

* * * * *